United States Patent [19]

Burke

[11] 4,233,329
[45] Nov. 11, 1980

[54] CONCENTRATED ACID SWELLING OF COLLAGEN IN PREPARATION OF EDIBLE COLLAGEN CASING

[75] Inventor: Noel I. Burke, Danville, Ill.

[73] Assignee: Tee-Pak, Inc., Chicago, Ill.

[21] Appl. No.: 733,559

[22] Filed: Oct. 18, 1976

Related U.S. Application Data

[63] Continuation of Ser. No. 561,117, Mar. 25, 1975, abandoned, which is a continuation of Ser. No. 347,293, Apr. 2, 1973, abandoned.

[51] Int. Cl.³ .............................................. A22C 13/00
[52] U.S. Cl. .................................... 426/277; 426/140; 426/278; 260/123.7
[58] Field of Search ............... 426/277, 514, 513, 516, 426/332, 278, 135, 646, 657, 105, 140; 260/123.7

[56] References Cited

U.S. PATENT DOCUMENTS 1,114,220  4/1938  Freudenberg et al. ............... 426/278
3,567,467  3/1971  Cohly ............................... 426/277 X Primary Examiner—Kenneth M. Schor
Attorney, Agent, or Firm—Paul Shapiro; Joseph E. Kerwin; Charles E. Brown

[57] ABSTRACT

In a process for producing a tubular collagen casing from a hide collagen source which comprises the steps of comminuting said collagen and forming a slurry, swelling said collagen with acid, then extruding, coagulating, tanning, and drying, the improvement which comprises the steps of substantially completely swelling collagen, in which the epidermal layer and hair has been removed, with a relatively concentrated weak non-toxic acid having a dissociation constant in water of from about $1 \times 10^{-6}$ to about $1 \times 10^{-3}$, e.g., lactic acid, citric acid, etc., for a time sufficient to effect substantial swelling of the collagen and then comminuting the collagen for forming a slurry. An advantageous feature of this improvement is that it permits forming desirable collagen casing from a collagen source obtained from a hide which has been subjected to substantial liming.

8 Claims, 4 Drawing Figures

CONCENTRATED ACID SWELLING OF COLLAGEN IN PREPARATION OF EDIBLE COLLAGEN CASING

This is a continuation, of Ser. No. 561,117, filed Mar. 25, 1975, now abandoned which is a continuation of Ser. No. 347,293, Apr. 2, 1973, now abandoned.

BACKGROUND OF THE INVENTION

Natural casings are prepared from the intestines of various edible animals, primarily cattle, hogs, and sheep. The intestines are removed from the slaughtered animal and are thoroughly cleaned by processes well known in the art. Natural casings, which have been thoroughly cleaned, are stuffed with various sausage meat compositions and formed into sausage links in preparation for cooking. The sausages which are thus formed are cooked by the consumer and the sausage casings eaten with the cooked sausage. In the preparation of certain smoked or precooked sausages, such as frankfurters and the like, the sausage is cooked or smoked or otherwise processed by the meat packer to render it edible without further treatment by the consumer.

Prior to about 1925, substantially all sausage casings were natural casings prepared from animal intestines. Since that time, there have been developed several types of synthetic sausage casings, principally of regenerated cellulose, which are used in the preparation of the major portion of frankfurters and similar sausages which are made and sold today. Cellulose casings are used in the preparation of large sausages, such as bolognas, salamis, and the like, and are removed from the sausage by the consumer at the time of final preparation for eating. Regenerated cellulose casings are primarily used in the preparation of frankfurter sausages wherein the casing is stuffed with sausage emulsion, linked, smoked, and cooked, and the casing removed from the finished product to yield skinless frankfurters.

Regenerated cellulose casings have not proven satisfactory for the processing of pork sausage inasmuch as cellulose is not edible with the sausage and does not transmit the fat which is released from the sausage during cooking. As a result, there has been some demand for an artificial sausage casing which is edible and which has the properties desired in a casing to be used in the processing of pork sausages.

DESCRIPTION OF THE PRIOR ART

In the past, edible sausage casings have been prepared from animal collagen usually obtained from animal hides. The animal hides were processed by removing the epidermal layer and the hair to obtain a suitable collagen source referred to as a corium split. One technique described in the art for preparing collagen casing from a corium split is to break the collagen into a fibrous structure and extrude the collagen fibers in the form of a doughy mass. Casings prepared in this manner typically have been hardened with formaldehyde and, therefore, have not been considered an edible casing even though the collagen itself is an edible material.

Another technique for the preparation of edible sausage casings from a corium split is to break the collagen fibers into a fibrous structure by acid swelling, then form an aqueous slurry containing the swollen fibers, and extrude the slurry through an annular die to form a casing. The casing then is coagulated, tanned, plasticized, and dried to form a translucent, non-fibrous, edible product.

A number of recent patents describing the production of collagen casing which involves the extruding of a slurry containing swollen collagen fibers have indicated that it is absolutely necessary to start with an unlimed collagen source if an edible casing is to be obtained. Representative of these patents are U.S. Pat. Nos. 3,123,653 and 3,194,865. Reports of work with collagen obtained from a hide which had been subjected to substantial liming indicated that it did not swell or the extruded casing coagulate properly. Apparently, the extruded tubular casing disintegrated in the coagulation bath or on subsequent processing.

Because substantial liming of hides was detrimental to casing, the basic process of the prior patents employed the use of fresh bovine hides and subjected them to mechanical treatment rather than liming. These hides were washed with cold water for the purpose of removing blood and dirt and then defleshed with a scraping machine. The hair and epidermal layer then were cut with a horizontal band knife to obtain a corium split.

While the early patents indicated that edible collagen casings could not be obtained from a hide source which had been subject to liming, there was a continuing desire to find a process whereby edible casings could be manufactured from such a hide source. One of the reasons for this desire is economic. Liming permits ready separation of hair from the skin without damage to the skin and prevents bacterial degredation of the hide during storage. Secondly, with liming the hide is much easier to handle in the splitting operation.

Recent patents have indicated that edible casings can be derived from limed animal hides provided that the liming period is relatively short, e.g., 3-12 hours. Representative of these patents include U.S. Pat. Nos. 3,413,130, 3,512,997, 3,627,542, 3,533,809 and 3,535,125. In these patents where limed hides are used as a source of collagen, there is included a deliming step which involves the neutralization of the lime in the hide by treatment with a dilute aqueous non-toxic acid having a pH of from about 2.5–6.5. This treatment forms water soluble calcium salts. Exemplary of the acid solutions used for deliming are citric acid in combination with an alkali metal citrate, acetic acid, fumaric, glutaric, hydrochloric, and others.

U.S. Pat. No. 3,373,046 shows a process somewhat different from the above patents for making edible casings from limed hides. In this patent, limed hides are neutralized with dilute acid, treated with an aqueous solution of a proteolytic enzyme, then swollen with dilute acid and extruded to produce tubular casing. The casing then is coagulated, tanned, plasticized, and dried to a final product.

Although limed hides have been used in the past to make edible collagen casings, none of the methods permitted long term liming of the hide and required carefully controlled conditions in order to produce casing of desired quality.

SUMMARY OF THE INVENTION

This invention is an improvement in a basic process for producing edible tubular collagen casings having desirable stuffing, linking, and cooking properties. The process is applicable to a hide source which has been subjected to a long liming period as well as a hide which has not been subjected to any liming. As stated above, the basic process comprised the steps of comminuting the hide; forming a slurry; swelling of the comminuted collagen slurry by treating with a weak, non-toxic acid; then extruding the slurry to form a tubular casing, coagulating, tanning, and drying the tubular casing formed.

The improvement in the basic process and constituting the basis of the invention comprises the steps of substantially completely swelling the collagen with a weak, non-toxic acid having a dissociation constant in water of from about $1 \times 10^{-6}$ to about $1 \times 10^{-3}$ and sufficient concentration for a time sufficient to effect substantially complete swelling of the collagen prior to comminuting the collagen and forming a slurry. The previous processes always employed a dilute acid for effecting swelling of the collagen and swelling was effected after grinding.

Advantages of the process include: use of limed hide collagen without impairing casing properties; improved storage characteristics of the corium splits; including less tendency to bacterial degredation; more transparent product; higher tear strength in casing; elimination of certain mixing and homogenizing steps in processing; and improved stuffing and linking characteristics.

BRIEF DESCRIPTION OF THE DRAWINGS

The process for the preparation of casings in accordance with this invention will be understood more fully by reference to the following description and accompanying drawings in which.

DESCRIPTION OF THE PREFERRED EMBODIMENTS

Collagen suitable for preparation of edible casings is obtainable from hide and tendon, although hide collagen is preferred for casing manufacture. Collagen is formed of a large number of fibers which, in turn, consist of a much greater number of fibrils of sub-microscopic size. The fibrils have a diameter of the order of 10–50 angstroms and lengths ranging from several thousand up to a several million angstroms. As stated previously, early patents describing the production of edible collagen casings emphasize the necessity of using collagen source materials which have not been subjected to a liming treatment. The reason which has been postulated is that the liming treatment allegedly prevents the bursting of collagen fibers to release the fibrils necessary for the formation of fibriller films. As a result, the gel casings disintegrate in the coagulation bath or on further processing. Later patents have shown that satisfactory edible collagen casings can be prepared from hides which have been subjected to liming. However, these later patents particularly emphasize the requirement that the liming period be for a relatively short time, e.g., 3–12 hours, and then subjected to a deliming treatment.

Figure 1:
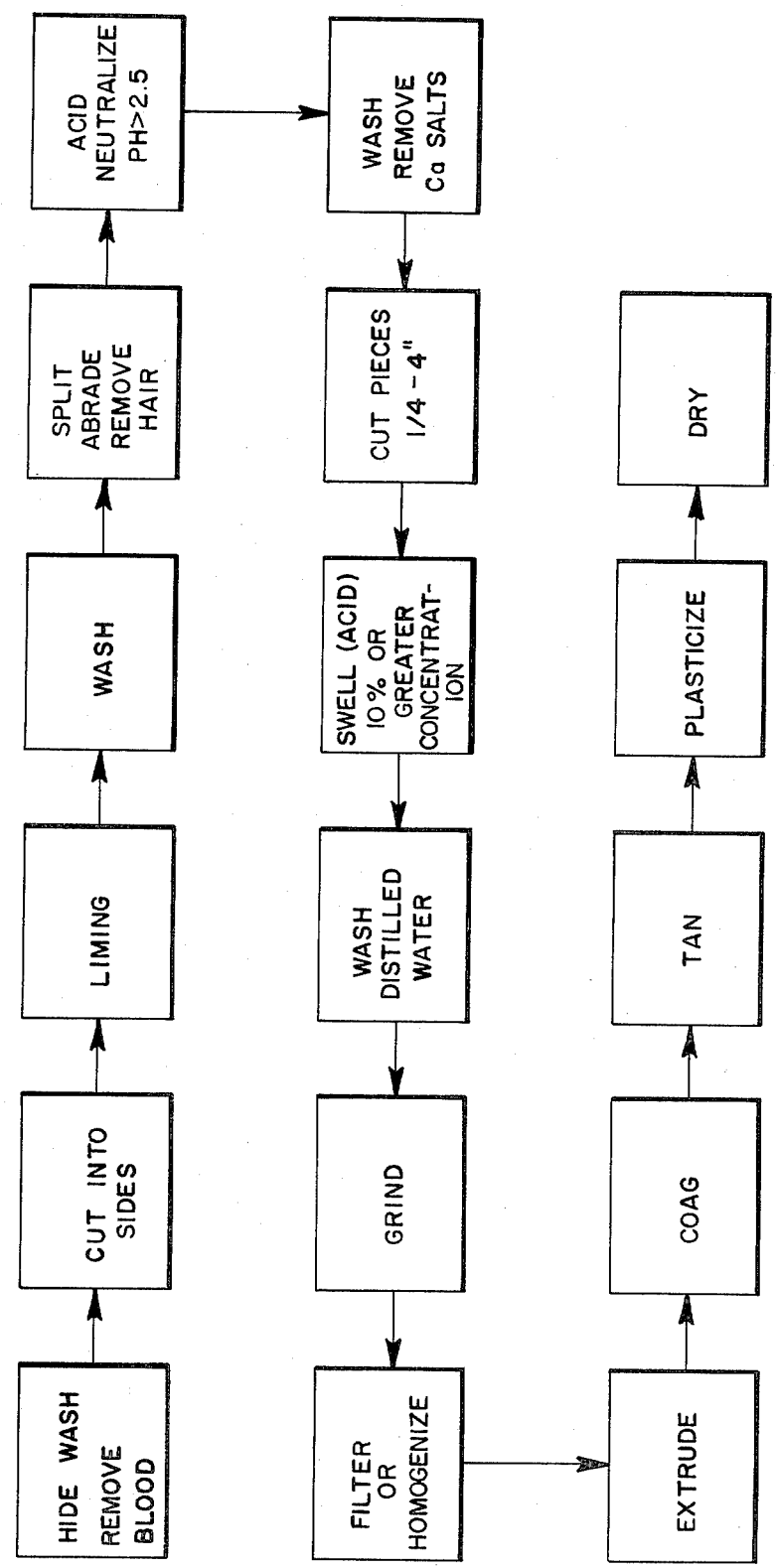
FIG. 1 is a block flow diagram illustrating the preparation of an edible collagen casing from a hide source which has been subjected to long term liming.

In FIG. 1, there is shown a flow diagram of a complete process for preparing edible casing from long term limed hides. Fresh cow hides are washed to remove the blood and the washed hides cut into sections or sides. Then, the hide is soaked in an aqueous saturated liming solution for loosening and partially or completely removing the hair. The soaked hide is washed to remove surface lime and then defleshed and the hair and epidermal layer removed. Typically, this liming procedure at Step 5 has been extremely fast, e.g., less than 24 hours and preferably 3–12 hours. With the procedure disclosed herein, the liming period can be indefinite, e.g., 3 or 4 days up to several months. After liming, the hide is abraded to remove the hair and is split to remove the epidermal layer and obtain a corium split. This split may then be neutralized usually with a diluted, e.g., 1–3%, non-toxic acid having a pH from about 2.5–6.5. The neutralized hides are washed to remove soluble calcium salts from the splits which are then ready for use in casing manufacture. In this process, if desired, the corium splits can be stored in a liming solution (and the neutralization step omitted) to prevent bacterial degradation prior to manufacture of collagen casing.

The corium splits are converted into an extrudable slurry by rough cutting and progressive comminution into smaller and smaller particles. The initial rough cutting is into square or rectangular pieces about 2–8 inches on a side. If the corium splits have been exposed to or stored under a lime solution they are washed thoroughly and the lime neutralized with a dilute solution of a weak acid.

After the corium split has been cut into said smaller pieces, the pieces then are contacted with a relatively concentrated weak acid solution in water having a dissociation constant in water of about $1 \times 10^{-6}$ to $1 \times 10^{-3}$ for a time sufficient to effect a substantially complete swelling of the collagen pieces. The acid swelling may be carried out on the uncut corium splits but the swelling renders the splits difficult to handle during cutting, i.e., the splits become quite slippery.

The acids used in practicing the invention are those conventionally used in swelling collagen. The acid must be non-toxic for preparing edible casing and be sufficiently weak that it will not deamidate the collagen at high concentration but effect swelling thereof. When the dissociation constant of the acid in water is lower than about $1 \times 10^{-6}$, e.g., $1 \times 10^{-8}$, it often is difficult to obtain swelling of the collagen even at high concentrations of acid. When the dissociation constant of the acid is greater than about $1 \times 10^{-3}$, e.g., $1 \times 10^{-2}$, the acid often causes deamidation of the collagen or other degradation of the collagen. The pH for desirable swelling is from about 1.5–3.5 and any acid solutions having a pH lower than about 1.5 as with acids having a dissociation constant of $1 \times 10^{-2}$ often does not effect swelling. Typical preferred acids effective for swelling collagen are the hydroxy organic acids, e.g., lactic, tartaric, and citric. Others include glutaric, malonic, acetic, fumaric, etc.

The basic difference in the swelling step of this invention from the steps described in the prior art is that the acid solutions employed are relatively concentrated and in the prior art they are dilute. By dilute, it is meant that the concentration of the acid used in the prior art is about 2.5–4%. Theoretically, it might be possible to swell collagen exposed to substantial liming with a dilute acid, e.g., 2.5–4%, given an indefinite period of time, e.g., several months, for effecting such swelling. However, experience shows that the dilute acid cannot penetrate and effect swelling of the collagen pieces which have been subjected to unlimited liming. The term "concentrated" as used herein refers to a concentration at which the acid can effectively penetrate the collagen splits or pieces and effect swelling thereof within a reasonably short time, e.g., from a few minutes to a maximum of a few days. Generally, for hydroxy acids, the concentration must be at least 10% and preferably at least 15%. In most swelling operations, the acid concentrations are broadly from about 10-45% by weight and preferably from about 15-25%. There is an inverse relation between acid concentration and time of swelling. As the acid concentration is increased, the swelling time decreases. At an acid concentration of 25-45%, the time for complete swelling is only a few minutes. At an acid concentration of 10%, the swelling time may be upwards of 24 hours or more.

Figure 3:
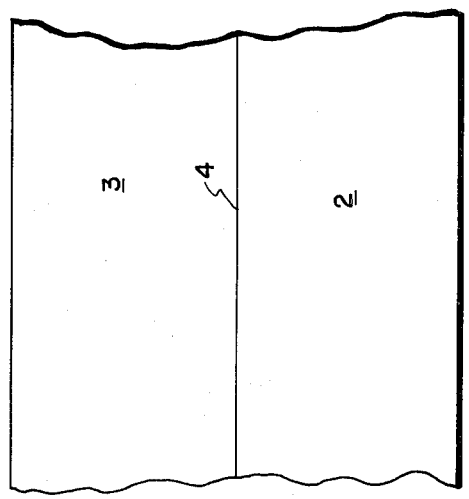
FIG. 3 is a cross sectional view of a corium split substantially completely swollen with concentrated acid.
Figure 2:
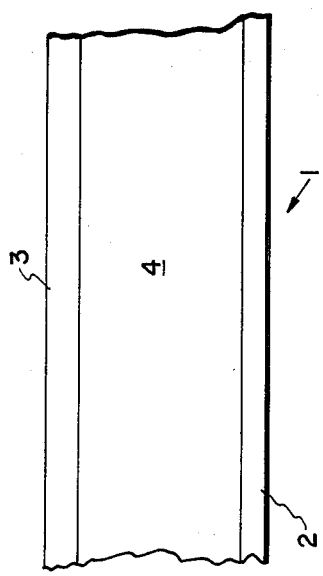
FIG. 2 is a cross sectional view of a corium split partially swollen with concentrated acid.
Figure 4:
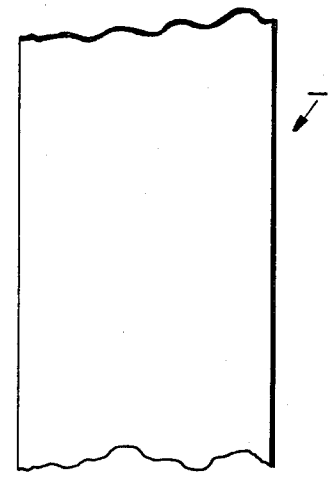
FIG. 4 is a cross sectional view of a completely swollen corium split.

The concept of swelling of collagen is represented in FIGS. 2, 3, and 4.

FIG. 2 shows a piece of collagen 1 (on an enlarged scale) which has been in contact with a concentrated lactic acid solution for a short period of time, e.g., 20-30 minutes. Swollen collagen areas 2 and 3 appear after such contact. The swollen areas indicate that slight penetration of the collagen by the acid has been accomplished and the fibrils expanded and broken. The unswollen collagen section 4 is readily detectable by visual examination as there is no expansion in the middle portion of the collagen piece. This figure represents a partially swollen collagen piece.

FIG. 3 shows the same collagen piece described in FIG. 2 except that it has been exposed for a longer period of time, e.g., 2-3 hours. At this stage, almost all of the collagen is swollen as noted by the enlargement of areas 2 and 3. However, visual examination shows that the section of unswollen collagen 4 which has not been penetrated by the concentrated acid solution has shrunk to a line. At this point, the collagen film is referred to as being substantially completely swollen as very little collagen remains in the unswollen state.

FIG. 4 shows a collagen piece which is completely swollen. The interface, as noted in FIG. 3, is not present in FIG. 4 and the collagen piece in a completely swollen state.

In terms of dimensions, an unswollen collagen piece may have a thickness of about 3-5 mm. whereas a substantially completely swollen collagen piece may have a thickness of about 5-8 mm. and a completely swollen collagen piece may have a thickness of about 6-10 mm. Thus, from the unswollen state to a completely swollen, the thickness approximately doubles.

As previously stated, when a collagen piece which has been subjected to substantial liming is contacted with a dilute weak acid such as a 2.5-4% lactic acid solution normally used in the past, little, if any, detectable swelling is noted even after several days exposure. On the other hand, if the collagen piece which has been subject to liming is contacted with a concentrated lactic acid solution, swelling begins immediately.

Contact of the collagen pieces with a concentrated acid solution must be for a time sufficient to effect substantially complete swelling of the collagen piece and preferably to effect complete swelling. Holding of the swollen pieces in concentrated acid solutions can be indefinite, e.g., 100 hours or more, but normally for reasons of efficiency and economy the swollen collagen pieces are processed as soon as swelling is complete. Generally, this period of contact to effect swelling takes from about 1-24 hours and usually from 2-6 hours at acid concentrations of from 10-25%. As might be expected, the contact period is inversely proportional to the concentration of the acid employed for effecting swelling. For example, if the acid concentration is 10%, a contact time will be longer than when the acid concentration is from 20-25%.

After the collagen pieces are swollen and they then are washed with distilled water to remove the surface acid, it should be noted that it generally is easier to remove the acid at this stage rather than at later stages in the process. However, the presence of some acid does not substantially affect the collagen at this point provided that the pH of the medium is not below about 2.5.

The washed collagen pieces then are passed through a meat grinder for forming a pulp. Successive passes usually are made through the meat grinder with finer grinds being made with each pass. The final pass is about a ¼ inch grind. The temperature during grinding is maintained at 20° C. or below as higher temperatures tend to interfere with the desirable physical properties of casing produced from this material. Ice commonly is introduced with the collagen pieces to the grinder to maintain the temperature at or below 30° C.

After grinding, the pulp is mixed with water to form a slurry having from about 2-8% by weight collagen. The slurry is filtered to remove agglomerates and to provide for a stable slurry of collagen. Unlike the slurries of the prior art, the slurry formed by this process does not require passage through a votator and then through a two-stage homogenizer to produce a spinnable slurry. Filtering is sufficient in itself to produce a spinnable slurry. However, the conventional process of votating, homogenizing, and then filtering can be carried out in this invention if desired.

After the slurry is filtered, it is then ready for preparation into tubular sausage casing. The remaining steps in the process of forming a casing then are the same as those described in the prior art processes. By that, it is meant that the slurry is extruded through an annular die, preferably one with counter rotating outer and/or inner parts, coagulated, tanned, plasticized, and dried to form a translucent tubular product.

To briefly summarize these steps, coagulation is conducted in a coagulation bath which usually consists of a concentrated solution of sodium sulfate or ammonium sulfate and from about 0.1-1% sodium hydroxide or ammonia to coagulate the casing and neutralize residual acid. The thin-walled gal collagen tube formed in the coagulating bath is then passed into a tanning or hardening bath. These baths contain tanning agents such as an aluminum complex, ferric salts, or non-toxic aldehydes. These agents provide sufficient wet strength in the casing to prevent reversion of the gel into a slurry upon further processing.

The casing then is plasticized by passing through a dilute aqueous solution containing a plasticizing agent, e.g., glycerol, sorbitol, etc. Sometimes softeners, e.g., acetylated monoglycerides, are included in the plasticizing bath where desired.

Drying normally is effected by inflating the collagen tube with air or other gas and passing through a dryer. The casing may be shirred directly from the dryer but this is not generally done inasmuch as the shirring machines operate at a higher speed than the extrusion rate in the process. Therefore, the casing is preferably stored on reels and fed separately to shirring machines of the type generally used in the shirring of cellulosic sausage casings. Typically, shirring machines are shown in U.S. Pat. Nos. 2,722,714; 2,722,715; 2,723,201; and 3,122,517.

The following examples are provided to illustrate preferred embodiments of the invention and are not intended to limit the scope thereof. All percentages are expressed as weight percentages.

EXAMPLE 1

Selected cattle hides from carcasses certified fit for human consumption, weighing about 65–75 pounds each, are washed in a large volume of circulating cool (10° C.) water to remove adhering blood. After washing, the hides are fleshed without curing to remove adhering fatty and muscular debris from the flaying operation.

The washed and fleshed hides then are treated by immersing in a liming bath consisting of a saturated solution of calcium hydroxide in water containing about 5% solid particulate calcium hydroxide and about 0.5% solution sulfhydrate. The temperature of the bath is maintained at about room temperature, i.e., 15°–25° C. This treatment is carried out for a period of about 14 days for the purpose of removing most of the hair from the hide.

After liming, the hides are removed from the liming bath and are permitted to drain for a period of about $\frac{1}{2}$ hour. The limed hides then are gently squeezed between rubber rollers to remove excess liming liquor. The hides then are cut or split in the plane of the hide into two approximately equal portions by weight. The upper or outer hide surface contains all of the hair, hair follicles, and sebaceous and sudorific glands. The inner or corium layer consist essentially of collagen. The outer or hair containing layer or split is discarded as unsuitable for use in the preparation of casing but may be used for the formation of leather laminates or covering.

The corium splits then are packed with lime solution in polyethylene bags which are in turn placed in 50-gallon fiber drums. Dry ice in sufficient quantities is sometimes placed above and below the polyethylene bags to chill the prepared collagen and to maintain it below about 5° C. during storage and shipment. Temperatures up to 25° C. may be tolerated for short times although refrigeration is preferred for long storage.

After receipt from the hide processor and when they are ready for use, the corium splits are removed from the drums and the polyethylene bags and immersed in water and washed thoroughly to remove surface and absorbed lime. The washing of the corium splits is continued until the liquor after contact with the splits for a period of about 20 minutes has a pH of about 7. At this point, washing is discontinued and the liquor removed. The splits then are contacted with a dilute edible acid such as lactic acid for neutralizing the absorbed lime and forming water-soluble calcium salts. The preliminary wash step with water is not absolutely necessary as water-soluble calcium salts can be formed by neutralization with an edible concentrated acid, e.g., lactic, and the salts washed from the pieces. However, for reasons of efficiency and economy, it is preferable to wash the lime soaked splits with water rather than neutralize all of the surface lime with acid for removing water-soluble calcium salts.

After the splits are neutralized, they are cut into small square or rectangular sections, e.g, from about $\frac{1}{4}$–4 inches on a side. These pieces then are immersed into a vat containing about 25% lactic acid in water. The pieces are left in the vat for about 3 hours to permit the collagen pieces to swell. It is possible to swell the splits first without cutting them into small, square or rectangular sections. However, swelling the splits prior to cutting makes handling difficult.

The swollen collagen pieces are removed from the vat containing the lactic acid and washed with distilled water to remove surface lactic acid. The small pieces of swollen collagen are converted to a fine pulp by successively passing them through a meat grinder. With each pass (usually three) through the meat grinder, successively smaller dies, the smallest being about $\frac{1}{4}$ inch, are employed. In this grinding operation, ice is mixed with the collagen pieces as they are ground to maintain the temperature below about 20° C. and preferably about 10° C. At this point, the ground pulp slurry is diluted by addition of water to bring the water content of the slurry to about 90–95% by weight.

The slurry containing the swollen collagen is passed through a bar filter having 0.016 inch clearance for the purpose of further dispersing the fiber. With past processes, the ground slurry is first passed through a high shear mixer such as a Votator and then passed through a two-stage homogenizer, the first stage operated at about 1000 psig and the second at about 500 psig. After these treatments, the slurry then is filtered to remove any undispersed fiber clumps or other solid contaminants. In contrast, with the procedure disclosed herein, the slurry does not require passage through a high speed shear mixer such as a Votator or passage through a two-stage homogenizer. However, such processing can be performed when desired.

The filtered slurry is generally deaerated prior to extruding by storage under vacuum to remove any entrained air. The deaerated slurry then is pumped under pressure through an annular die to produce a thin-walled product adapted for use as a sausage casing. The die preferably is one having counter-rotating inner and/or outer parts and this type is well known in the prior art as shown in Becker, U.S. Pat. No. 2,046,541.

The casing is extruded into a coagulating bath consisting of about 40% ammonium sulfate (sodium sulfate can also be used) in water. When the casing is extruded as a thin-walled tube into this concentration of ammonium sulfate, the collagen fibrils are dehydrated and collapsed to form a film which is sufficiently coherent for further processing. Generally, the coagulation bath is circulated both inside and outside the tube to maintain the tube in an inflated condition and to insure proper coagulation of the casing both on the inside and the outside.

After the casing is coagulated, it is necessary to tan the film to give it sufficient strength for further processing and for stuffing with meat. If the film were taken from the ammonium sulfate coagulating bath and dried, the film would be of moderate dry strength but would revert to a paste on contact with water. It is, therefore, necessary for the casing to be tanned or hardened to provide the wet and dry strength required in an edible casing.

From the coagulation bath, the casing is passed into a first tanning bath which comprises a solution containing from about 5–20% of aluminum sulfate $Al_2(SO_4)_3$–18 $H_2O$, 3–7% sodium citrate (or an equivalent amount of citric acid) and 3–7% sodium hydroxide. The tanning bath is formulated so that the sodium citrate or citric acid forms a complex with the aluminum sulfate and the sodium hydroxide neutralizes a portion of the aluminum-citrate complex to render the same about $\frac{1}{3}$–$\frac{2}{3}$ basic. This results in a tanning bath having a pH of about 4.0 and permits the use of aluminum concentrations for tanning which are many times the concentrations available with other aluminum tanning baths such as alum tanning baths. A suitable tanning bath may similarly be made from ferric salts by formation of a citrate complex and partially neutralizing the complex with sodium carbonate or other weak alkali to convert the complex to an elated form. Other tanning agents known in the art of collagen casing manufacture may be used.

After the casing is tanned to a desirable level, it is passed through one or more wash baths to wash out any unreacted tanning or hardening reagent. The casing then is passed through a plasticizing bath usually consisting of an aqueous solution of glycerin. Other plasticizers such as sorbitol, dipropylene glycol, triethylene glycol, etc., can also be used. The plasticizing bath, which often includes a fat liquoring bath, introduces a substantial amount of the desired plasticizer and a softening agent into the casing which prevents the casing from becoming hard and brittle after drying and which gives the casing improved stuffing, linking, or cooking properties. Often, acetylated monoglycerides are added to the plasticizing bath in order to soften the film.

After the casing leaves the plasticizing and fat liquoring bath, it is dried, shirred, and packaged. The finished casing possesses desirable frying and linking characteristics and is extremely transparent.

EXAMPLE 2

The process of Example 1 is repeated except that the liming period of the hide is for a period of 7 days as compared to a 14 day liming period. On receipt of the limed split from the processor, the corium split is stored under a saturated solution of lime in water to prevent bacterial degradation. The corium splits may be stored for periods of several months.

Casing made from the above limed splits in accordance with the steps of Example 1 is extremely transparent for collagen casing, has excellent linking and stuffing characteristics, and desirable frying properties.

EXAMPLE 3

Selected cattle hides from carcasses certified fit for human consumption, weighing about 65–75 pounds each, are washed in a large volume of circulating cool (10° C.) water to remove adhering blood. After washing, the hides are fleshed without curing to remove adhering fatty and muscular debris from the flaying operation.

The washed and fleshed hides then are treated in a liming bath containing 6% weight of calcium hydroxide and 1.5% weight sodium sulfhydrate (the liming bath may contain up to 3% dimethylamine sulfate), as solution or slurry contained in about 450% weight of water at room temperature (15°–20° C.), all percentages being calculated on the weight of the hide treated. This treatment is carried out in a period of about 6 hours and is sufficient to remove most of the hair from the hide.

After liming, the hides are removed from the liming bath and permitted to drain for a period of about one-half hour. The limed hides then are gently squeezed between rubber rollers to remove excess liming liquor. The hides which have been limed, drained, and squeezed then are cut or split in the plane of the hide into two approximately equal portions by weight. The upper or outer hide surface contains all of the hair, hair follicles, and sebaceous and sudorific glands. The inner or corium layer consists essentially of collagen. The outer or hair containing layer or split is discarded as unsuitable for use in the preparation of casing but may be used for the formation of leather laminates or coverings.

The corium layer or split is placed in a tank or vat containing about 4.5 times the hide weight of water. A gentle agitation is used to insure even removal of debris and adhering lime solution or slurry. The hides are washed during a period of 20–30 minutes. The washings are removed and the corium splits resuspended in water in a proportion of about 4.5 times their weight. An edible acid which is relatively weak, e.g., lactic acid, at a concentration of 2–4 ounces of 44% lactic acid per quart of 15° C. water is added in small portions at 15 minute intervals with gentle agitation to neutralize the lime forming water soluble calcium salts. The liquor is tested for pH before each addition of acid and the point when the pH is permanently depressed below 7 is considered the end point. In general, this requires about 1.5% of the 44% lactic acid based on the weight of the corium splits.

The neutralized and delimed corium splits are removed from the neutralization bath, drained, and rinsed in cool (15° C.) water, packed in polyethylene bags which are in turn placed in 50 gallon fiber drums. Dry ice in sufficient quantities is sometimes placed above and below the polyethylene bags to chill the prepared collagen and to maintain it below 5° C. during storage and shipment. The corium splits used in this and the following examples are obtained by this process as this is the typical process used by a commercial hide processor in the manufacture of corium splits for edible collagen casings.

The neutralized splits are cut into small, square or rectangular sections, e.g., from about $\frac{1}{4}$–4 inches on a side. These pieces then are immersed into a vat containing 17.8% lactic acid in water and left for about 8–24 hours until the collagen pieces are completely swollen. The swollen collagen pieces then are removed from the vat and washed with distilled water to remove surface lactic acid.

After washing, the small pieces of swollen collagen are converted to a fine pulp by successively passing them through a meat grinder. With each pass (usually 3) through the meat grinder, successively smaller dies, the smallest being about $\frac{1}{4}$ inch, are employed. In this grinding operation, ice is mixed with the collagen pieces to maintain the temperature below about 20° C. and preferably below about 10° C. At this point the ground pulp slurry is diluted by addition of water to bring the water content of the slurry to about 90%–95% by weight.

The slurry containing swollen collagen is passed through a bar filter having a 0.016 inch clearance for the purpose of further dispersing the fiber. In the past, the slurry is usually passed through a high speed shear mixer, e.g., a votator, and homogenized in a two-stage homogenizer, the first stage at about 1000 psig and the second at about 500 psig and then filtered to remove any undispersed fiber clumps or other solid contaminants. This procedure is not necessary in the instant case. The slurry after filtering is generally deaerated by storage under vacuum prior to extrusion.

The filtered or homogenized collagen slurry which has been deaerated then is pumped under pressure through an annular die to produce a thinwalled product for use as a sausage casing. The die preferably is one having counter-rotating inner and outer parts and this type is well known in the prior art as shown in Becker, U.S. Pat. No. 2,046,541.

The casing is extruded into a coagulating bath consisting of about 40% ammonium sulfate (sodium sulfate can also be used) in water. When the casing is extruded as a thinwalled tube into this concentration of ammonium sulfate, the collagen fibrils are dehydrated and collapsed to form a film which is sufficiently coherent for further processing. Generally, the coagulation bath is circulated both inside and outside the tube to maintain the tube in an inflated condition and to insure proper coagulation of the casing both on the inside and the outside.

After the casing is coagulated in the ammonium sulfate solution (other coagulating baths commonly used can be used in place of the ammonium sulfate), it is necessary to tan the film to give it sufficient strength for further processing and for stuffing with sausage meat. If the film were taken from the ammonium sulfate coagulating bath and dried, the film would be of moderate dry strength but would revert to a paste or soft gel on contact with water. It is, therefore, necessary for the casing to be tanned or hardened to provide the wet and dry strength required in an edible casing.

From the coagulation bath, the casing is passed into a first tanning bath which comprises a solution containing from about 5%–20% of aluminum sulfate $Al_2(SO_4)_3.18\ H_2O$, 3–7% sodium citrate (or an equivalent amount of citric acid) and 3–7% sodium hydroxide. The tanning bath is formulated so that the sodium citrate forms a complex with the aluminum sulfate and the sodium hydroxide neutralizes a portion of the aluminum-citrate complex to render the same about $\frac{1}{3}$–$\frac{2}{3}$ basic. This results in a tanning bath having a pH of about 4.0 and permits the use of higher aluminum concentrations for tanning than are available with other aluminum tanning baths, such as alum tanning baths. A suitable tanning bath may similarly be made from ferric salts by formation of a citrate complex and partially neutralizing the complex with sodium carbonate or other alkali to convert the complex to an olated form.

After the casing is tanned to a desirable level, it is passed through one or more wash baths to wash out any unreacted tanning or hardening reagent. The casing then is passed through a plasticizing bath usually consisting of an aqueous solution of glycerin. Other plasticizers such as sorbitol, dipropylene glycol, triethylene glycol, etc., can be used also. The plasticizing bath, which may include a fat liquoring bath, introduces a substantial amount of the desired plasticizer and softening agent into the casing which prevents the casing from becoming hard and brittle after drying and which gives the casing improved stuffing, linking, or cooking properties. Acetylated monoglycerides may be added to the plasticizing bath in order to soften the film.

After the casing leaves the plasticizing and fat liquoring bath, it is dried, shirred, and packaged. The finished casing possesses desirable frying and linking characteristics and is extremely transparent.

To illustrate important physical properties of the casing, the wet casing, after plasticization and before drying, has a Scott test of about 1400–1500 g, a rewet Elmendorf number in the longitudinal direction of 67.5, and in the transverse direction of 74 and a burst diameter of about 36 mm. The Elmendorf test is a conventional test for edible collagen casings and is used for determining the tear resistance of collagen casing in the longitudinal and transverse directions. The higher the Elmendorf number, the greater resistance to tear. However, casings having an Elmendorf value of over 100 may be undesirable because they may be difficult to bite and chew. A number of from about 60–85 is desirable.

Casing prepared by a commercial process having the same diameter and thickness as the casing of this example has a Scott tensile value of about 600–800 g, a rewet Elmendorf of about 15–25 in the longitudinal direction and about 15–25 in the transverse direction.

EXAMPLE 4

The process of Example 3 was repeated except that the corium splits, as received from the hide processor, were stored for several weeks under a saturated lime solution. When the splits were to be used, they were washed in tap water until the wash liquor had a pH of 7 after 20 minutes soaking. The washed splits were then treated with dilute lactic acid to remove absorbed lime and then swollen by soaking in a more concentrated, e.g., 20%, lactic acid. The remainder of the processing was as in Example 3. The casing obtained was of like quality and strength.

EXAMPLE 5

Fresh steer hides are washed with cold water at 20° C. or less in a rotating drum for about 10–24 hours. After washing, the hides are defleshed with a scraping machine and the hair and epidermis are cut off with a horizontal band knife. This preliminary cleaning is accomplished with standard tannery equipment.

The remaining hair and poorly cleaned sections are cut off by hand and composites are prepared from five hides. The hide composites then are cut into 2–8 inch square or rectangular sections and immersed into a vat containing 20% lactic acid in water. The pieces of collagen are allowed to remain in the vat for about 3 hours to permit substantially complete swelling.

The swollen collagen then is reduced to a pulp by three passes through a meat grinder, each pass being a finer grind with the final grind being about $\frac{1}{4}$ inch in size.

The pulp then is diluted with water to form an extrudable slurry, filtered, extruded, coagulated, tanned, and dried in the same manner as the casing processed in Example 1. The resulting casing is quite transparent and possesses desirable frying and linking characteristics.

EXAMPLE 6

The process of Example 1 is repeated using a lactic acid concentration of 10% instead of 17.8% and a tubular casing made from a slurry having a collagen content of 5.8% and 1.5% lactic acid having excellent transparency and cooking properties is produced. The casing has a Scott value of about 1,050 g and a rewet Elmendorf in the longitudinal directions of 34.2 in the transverse direction of 18.2. The casing has excellent transparency and possesses desirable frying and linking characteristics.

EXAMPLE 7

In this example, the process of Example 1 is repeated using 22% lactic acid for effecting swelling of the collagen rather than the 17.8%. The casing is produced from a slurry having a collagen content of 5.7% and a lactic acid content of 2.4%. The resulting casing is highly transparent and has excellent cooking properties. The casing has a Scott value of about 2,400 g, an Elmendorf number of 37.5 in the longitudinal direction and 47.5 in the transverse direction. The casing also has excellent strength characteristics and possesses desirable linking and frying characteristics.

EXAMPLE 8

When the process of Example 1 is repeated using 20% citric acid in water instead of lactic acid, a casing is produced having desirable physical properties for the processing of sausages therein. The casing is highly transparent and more transparent than some commercial casings. The casing also has excellent strength characteristics, possesses desirable linking and frying characteristics.

EXAMPLE 9

Corium splits as obtained from the processor in Example 1 are processed by a conventional commercial method such as in Example 1 of U.S. Pat. No. 3,413,130 wherein the splits first are sectioned into pieces of about ½ to 4 inches square passed through a meat grinder reducing the pieces to a pulp, and then treating with a solution of about 1.5-3% lactic acid in water. The collagen does not swell adequately on treatment with the lactic acid even when exposed for several days. Furthermore, the extruded casing is not coagulated in the coagulating bath to form a coherent film of adequate strength for further processing.

I claim:

1. A process of producing an edible tubular collagen casing from animal hide collagen which comprises the steps, in sequence, of cutting collagen splits which have been derived from limed hides exposed to substantial liming into small pieces, contacting the collagen pieces with an aqueous solution of a non-toxic acid having a concentration of 10-45% by weight and a dissociation constant in water of about $1 \times 10^{-6}$ to $1 \times 10^{-3}$, at a pH of 1.5-3.5 for a time sufficient to effect substantially complete swelling of the collagen, grinding the collagen pieces into successively smaller particles until a pulp of swollen collagen is formed, forming a slurry containing about 2-8% by weight collagen pulp, extruding the slurry in tubular form, coagulating, tanning and drying the casing thus formed to obtain the tubular casing.

2. The process of claim 1 wherein said collagen is derived from bovine hides.

3. The process of claim 2 wherein said time for substantially complete swelling of said collagen is from a few minutes to 24 hours.

4. The process of claim 1 wherein said swelling is conducted in a period of from a few minutes to 24 hours.

5. The process of claim 4 wherein said acid concentration is from about 10-25%.

6. The process of claim 5 wherein said acid is a hydroxy carboxylic acid.

7. The process of claim 5 wherein said acid is selected from the group consisting of lactic, tartaric, and citric.

8. The process of claim 7 wherein said acid is lactic.

* * * * *